United States Patent [19]

Boerner et al.

[11] Patent Number: 4,994,540
[45] Date of Patent: Feb. 19, 1991

[54] SAG RESISTANT, UNFILLED, LOW VISCOSITY URETHANE STRUCTURAL ADHESIVE

[75] Inventors: Peter W. Boerner, Massillon, Ohio; Richard W. Mitesser; Jeffrey F. Dormish, both of Pittsburgh, Pa.

[73] Assignee: Mobay Corporation, Pittsburgh, Pa.

[21] Appl. No.: 464,821

[22] Filed: Jan. 16, 1990

[51] Int. Cl.$^5$ ............................................. C08G 18/32
[52] U.S. Cl. ........................................ 528/44; 528/44; 528/64; 521/137
[58] Field of Search ................. 528/44, 54, 55, 58, 528/60, 66, 85; 521/137, 163, 167

[56] References Cited

U.S. PATENT DOCUMENTS

| | | | |
|---|---|---|---|
| 3,714,127 | 1/1973 | Fabris et al. | 260/77.5 AM |
| 3,979,364 | 9/1976 | Rowton | 260/77.5 AM |
| 4,336,298 | 6/1982 | Schwarz | 428/285 |
| 4,444,976 | 4/1984 | Rabito | 528/60 |
| 4,552,934 | 11/1985 | Rabito et al. | 525/458 |
| 4,595,445 | 6/1986 | Hombach et al. | 156/307.3 |
| 4,686,242 | 8/1987 | Turner et al. | 521/137 |
| 4,743,672 | 5/1988 | Goel | 528/44 |

Primary Examiner—John Kight, III
Assistant Examiner—Duc Truong
Attorney, Agent, or Firm—Joseph C. Gil; Aron Preis

[57] ABSTRACT

A two component urethane structural adhesive formulation was developed containing a multi-functional aromatic amine terminated polyether as part of the curative component. The adhesive of the present invention is prepared by mixing and reacting the following low viscosity components:

Component A, a curative comprising a polyol and an aromatic amine terminated polyether containing two or more primary amine groups and having a molecular weight of from 250 to about 10,000 and Component B, comprising a polyisocyanate. The adhesive of the invention is characterized by its improved sag resistance, its heavy body which is obtained without resort to included fillers or to prepolymerization of the components and by the relatively low viscosity (under about 15,000 cps) of its components which permits easy bulk handling.

6 Claims, No Drawings

SAG RESISTANT, UNFILLED, LOW VISCOSITY URETHANE STRUCTURAL ADHESIVE

FIELD OF THE INVENTION

The present invention relates to urethane based adhesives and more particularly, to sag resistant, read-through free adhesives.

SUMMARY OF THE INVENTION

A two component urethane structural adhesive formulation was developed containing a multi-functional aromatic amine terminated polyether as part of the curative component. The adhesive of the present invention is prepared by mixing and reacting the following low viscosity components:

Component A, a curative comprising a polyol and an aromatic amine terminated polyether containing two or more primary amine groups and having a molecular weight of from 250 to about 10,000 and Component B, comprising a polyisocyanate. The adhesive of the invention is characterized by its improved sag resistance, its heavy body which is obtained without resort to included fillers or to prepolymerization of the components and by the relatively low viscosity (under about 15,000 cps) of its components which permits easy bulk handling.

BACKGROUND OF THE INVENTION

Two component polyurethane adhesives are known and have been widely used in bonding structural components. In practice, a first component which includes an isocyanate prepolymer is mixed with a curative, polyhydroxyl component and suitable catalysts and other functional agents.

A sag resistant, two component polyurethane adhesive has been disclosed in U.S. Pat. No. 4,743,672. The adhesive thus disclosed comprise an isocyanate prepolymer and as a second component a mixture of polyol, a poly(alkylene) oxide polyamine and a catalyst, the aromatic amine terminated polyether of the present invention is not at all disclosed. Also noted is U.S. Pat. No. 4,595,445 which disclosed an adhesive composition comprising a polyisocyanate of retarded reactivity and a polyamine.

U.S. Pat. Nos. 3,979,364, 4,336,298, 4,444,976 and 4,552,934 and European Pat. No. 63,534 all relate to the use of amines in making non-sagging adhesives.

In U.S. Pat. No. 3,714,127, there is disclosed the addition of a diamine to a two component polyurethane based adhesive for the purpose of increasing the viscosity of the adhesive to eliminate run-off or dripping.

It is an object of the invention to develop a two component polyurethane structural adhesive which is suitable for bonding relatively thin and or elastic and or soft sheets classified as class A surfaces.

It is a further object of the invention to develop an adhesive which is suitable for high volume bonding applications which is characterized in that the viscosity of each of its components is less than 15,000 cps.

DETAILED DESCRIPTION OF THE INVENTION

The presently disclosed adhesive system is superior to current, commercially significant, two component, non-sagging polyurethane and epoxy adhesives. These prior art adhesives are typically highly filled pastes which are not amenable to bulk handling operations and are difficult to pump and mix and present waste disposal problems. In addition, the use of these prior art systems is associated with the so called "read through" phenomenon which is often times objectionable. "Read through" is a term of art used to describe a condition whereby the application of structural adhesive causes the substrate on which it is applied to deform. This condition represents an objectionable appearance in most cases, especially where relatively thin sheets are bonded together and is a characteristic of current commercial epoxy and urethane based adhesives. The condition pointed to the need for a structural adhesive which does not exhibit this condition. The absence of a "read through" condition is required of surfaces suitable for painting, known in the art as "class A3[ surfaces. The adhesive of the present invention is suitable for bonding sheets of composite materials such as reinforced and unreinforced thermoset sheets without causing a "read-through". This allows for the use of thin substrates and or softer substrates to be bonded while maintaining the "class A" side integrity.

The adhesive of the present invention is prepared by mixing and reacting the following low viscosity components:

Component A, a curative comprising a polyol and an aromatic amine terminated polyether containing two or more primary amine groups and having a molecular weight of from 250 to about 15,000, and Component B, comprising a polyisocyanate. The adhesive of the invention is characterized in its improved sag resistance, its heavy body which is obtained without resort to included fillers or to prepolymerization of the components and by the relatively low viscosity (under about 15,000 cps) of its components which permits easy bulk handling.

Preferably the components of the present adhesive are as follows:

Component A (i) 0.1 to 4.0, more preferably 0.5 to 2.0 equivalents of a polyhydroxy functional material having an equivalent weight of at least 150 and a hydroxy functionality of at least 2, (ii) 0.03 to 5.0, more preferably 0.07 to 2.0 equivalents, of a multi functional amine terminated polyether having an equivalent weight of about 250 to 3000, and, optionally, (iii) 2 to 7, more preferably 3 to 5 equivalents of low molecular weight aliphatic polyol having hydroxy functionality of at least 2 and a molecular weight of below 500, and/or optionally (iv) one or more isocyanate reactive polyamines, preferably aliphatic diamines, having an equivalent weight of about 30 to 200, and a functionality of about 2 to 4, in a sufficient amount to produce adequate resistance to flow when components A and B are mixed, and

Component B (v) an organic isocyanate, in an amount sufficient to render the isocyanate index between about 0.80 to 1.50, preferably 1.1 to 1.3.

The adhesive may optionally contain catalysts, non-foaming agents and drying agents.

The polyols suitable in the preparation of the adhesive of the invention are known. Included are hydroxy functional compounds having a functionality of two or greater including both triols and tetrols having an equivalent weight of about 150 to 3000. Compounds having a functionality of three and an equivalent weight of about 2000 are preferred. Among the suitable materials mention may be made of polyether polyols, polyesteramide polyols, polyester polyols and polycarbonate polyols.

The preferred polyether polyol is generally an alkylene oxide adduct of a polyhydric alcohol having a functionality of 3 or more. The alkylene oxide may suitably be ethylene oxide, 1,2-propylene oxide or 1,2-butylene oxide or a mixture of some or all of these.

Among the preferred polyether polyols are the so-called PHD polyols which are prepared by reacting an organic diisocyanate and hydrazine in the presence of a polyether polyol. U.S. Pat. No. 3,325,421 which is incorporated herein by reference discloses a method for producing suitable PHD polyols by reacting a stoichiometric equivalent (or less) of isocyanate per equivalent diamine dissolved in a polyol having a molecular weight of at least 500 and a hydroxyl number of less than or equal to 225. Also incorporated herein by reference in this context are U.S. Pat. Nos. 4,042,537 and 4,089,835. Other suitable hydroxy functional materials, the so-called polymer polyols are prepared by polymerizing styrene and acrylonitrile in the presence of a polyether. These have been disclosed in U.S. Pat. Nos. 3,383,351, 3,304,273, 3,523,093, 3,652,639, 3,823,201 and 4,390,645 all incorporated herein by reference.

Polyester amide polyols are known in the art and include the predominantly linear condensates obtained from polyvalent saturated and unsaturated carboxylic acids or their anhydrides and polyhydric saturated and unsaturated amines, alcohols, diamines, polyamines and mixtures thereof.

Suitable polycarbonate polyols include those which may be obtained by reacting diols such as 1,3-propane diol, 1,4-butane diol and/or 1,6-hexane diol, diethylene glycol, triethylene glycol and tetraethylene glycol with diaryl carbonate (such as diphenyl carbonate) or phosgene.

The polyester polyols of the invention are well known in the art. It will, however, be understood that the term includes chain extended polyesters made from a glycol (e.g., ethylene and/or propylene glycol) and a saturated dicarboxylic acid (e.g. adipic acid as well as polycaprolactone diols). Other polyester polyols include poly(ethylene adipate) glycol, poly (propylene adipate) glycol, poly(butylene adipate) glycol, poly(neopentyl sebacate) glycol, etc. Also, suitable polyester polyols include those obtainable by reacting such polyols as 1,4-butanediol, hydroquinone bis(2-hydroxyethyl)ether, ethylene glycol, diethylene glycol, triethylene glycol, propylene glycol, dipropylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,2-cyclohexanediol, 1,2-dimethyl-1,2-cyclohexanediol, glycerol, trimethylol propane, trimethylol ethane, 1,2,4-butanetriol, 1,2,6-hexanetriol, pentaerythritol, dipentaerythritol, tripentaerythritol, mannitol, sorbitol, methyl-glycoside, and the like with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlorophthalic acid and chlorendic acid; the acid anhydrides and acid halides of these acids may also be used.

The amine terminated polyethers suitable in the present invention are polyethers containing aromatically bound primary or secondary (preferably primary) amino groups. Compounds containing amino end groups can also be attached to the polyether chain through urethane, ester, or ether groups. These aromatic amine terminated polyethers can be prepared by any of several methods known in the art.

In one method for preparing aromatic amine terminated polyethers, relatively high molecular weight polyether polyols may be converted into the corresponding anthranilic acid esters by reaction with isatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or ketimines and hydrolyzing the reaction product.

Preferred aromatic amine terminated polyethers include aminopolyethers obtained by the hydrolysis of compounds containing isocyanate end groups. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine terminated polyethers are prepared by hydrolyzing an aromatic isocyanate compound having an isocyanate group content of from 0.5 to 40% by weight. The most preferred such polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645; European Patent Application No. 97,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, and 4,855,504 and in U.S. application Ser. Nos. 07/232,302 (filed Aug. 17, 1988) and 07/389,384 (filed Aug. 2, 1989).

Other suitable amine terminated polyethers include aminophenoxy-substituted polyethers described, for example, in European Patent Applications Nos. 288,825 and 268,849 and U.S. application Ser. No. 07/266,725 (filed Nov. 3, 1988).

Preferred aromatic amine terminated polyethers are prepared by first reacting a polyether containing two to four hydroxyl groups (preferably a polyoxypropylene polyoxyethylene triol having an equivalent weight greater than about 1000) with an excess of an aromatic polyisocyanate (preferably toluene diisocyanate) to form an isocyanate-terminated prepolymer and then hydrolyzing the isocyanate groups of the isocyanate-terminated prepolymer to form the amine terminated polyether.

Suitable amine terminated polyether conforms structurally to

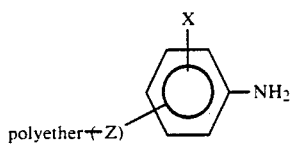

where X is a hydrogen or a halogen atom, or a $C_1$–$C_4$ alkyl, and Z is preferably —O—, or

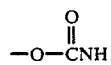

and is characterized in that it has a functionality is preferably about 2 to 6, more preferably 2.5 to 3.5 and an equivalent weight of about 250 to 3000, preferably 1500 to 2000.

(iii) The optional low molecular aliphatic polyol of the invention is a chain extender and comprise one or more aliphatic polyols having a functionality of at least 2, preferably 2 or 3, having a molecular weight of below 500. The low molecular aliphatic polyols suitable in the present context include diethylene glycol, triethylene glycol, propylene glycol, 1,3-dihydroxypropane, 1,4-dihydroxy-butane, 1,3-butanediol, 1,6-dihydroxyhexane, and trimethylol propane.

(iv) the optional low molecular weight isocyanate reactive polyamine of the invention is characterized in that its equivalent weight is about 30 to 200 and in that its functionality is 2, 3 or 4. Among the suitable amines are isophorone diamine, diethylene toluene diamine, methylene bis cyclohexylamine, dicyclohexyl methane 3,3'-dimethyl-4,4'-diamine, diethylene triamine methylene dianaline propylene diamine, butylene diamine, amylene diamine, hexylene diamine and toluene diamine. Aliphatic diamines are preferred. Component (iv) may be added in an amount sufficient to produce an adequate resistance to flow when components A and B are mixed. The term "adequate resistance to flow" is a term of art which to a skilled artisan means that when a bead of adhesive is applied to a vertical surface, it does not run, drip or sag.

As component (B), substantially any organic isocyanate may be useful in the practice of the invention. Aromatic, aliphatic, cycloaliphatic, arylaliphatic and heterocyclic polyisocyanate may be used. Examples of suitable polyisocyanates are described by W. Siefken in Justus Liebigs Annalen der Chemie, 562, pages 75 to 136. Among the polyisocyanates described therein are those corresponding to the general formula $Q(NCO)_n$ wherein n represents 2–4 preferably 2 and Q represents an aliphatic hydrocarbon radical containing from 2 to 18, preferably 6–10 carbon atoms. Typical aromatic polyisocyanates include m-phenylene diisocyanate, o-phenylene diisocyanate, polymethylene polyphenylisocyanate, 2,4-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatephenyl)methane and 4,4' diphenylpropane diisocyanate and mixtures thereof. Preferred are 2,4- and 2,6-toluene diisocyanates and methylene-bridged polyphenyl polyisocyanate mixtures having a functionality of from about 2 to about 4. Most preferred methylene-bridged polyphenyl polyisocyanate mixtures contain 20 to about 100 percent by weight of methylene diphenyl diisocyanate isomers with the balance being polymethylene polyphenyl polyisocyanate having higher molecular weights. Especially preferred are toluene diisocyanates, diphenylmethane diisocyanate, isophorone diisocyanate and methylenebiscyclohexyl isocyanate.

The adhesive of the invention may also contain any of the known agents which are recognized in the art for their specific function, including catalysts, drying agents and anti-foaming agents. These include the conventional polyurethane catalysts preferably tin catalysts and tertiary amine catalysts. The adhesive of the invention may further include isocyanate prepolymers and/or fillers.

Suitable organic tin compounds include tin-(II) salts of carboxylic acids such as tin acetate, tin octoate, tin 2-ethylhexanoate and tin laurate, and the tin-(IV)-compounds such as dibutyl tin oxide, dibutyl tin dichloride, dibutyl tin diacetate, dibutyl tin dilaurate, and dibutyl tin maleate or dibutyl tin diacetate.

Preferred tin catalysts include sulphur containing tin compounds such as di-(octyl)-tin-(IV)-bis-thiomethyl or dimethyl tin-(IV)-bis-thiolauryl; dimethyl-tin-bis-thioglycolic acid hexyl ester; or dibutyl tin-bis-thioglycolic acid octyl ester. The above-mentioned catalysts can obviously be used as mixtures. Combinations of organic metal compounds with amino pyridines, hydrazino pyridines (German Auslegeschriften Nos. 2,434,185, 2,601,082 and 2,603,834) or 1,4-diazabicyclo-2,2,2-octane and/or conventional tertiary amine catalysts of the type usually used in polyurethane chemistry can also be used if desired. The catalysts when used are generally used in a quantity of 0.001 to 5% by weight, preferably 0.01 to 2% by weight based on the weight of all the components. The use of a catalyst brings about a shortening of the handling time of the adhesive system.

In the practice of the invention component (v), the organic isocyanate is mixed with the second, curative, component which is a mixture of (i), (ii) ,and optionally (iii) and/or (iv)—in a predetermined ratio designed to produce an isocyanate index of from 0.80 to 1.50, preferably 1.1 to 1.3. The components may be mixed in any of a variety of conventional, well known methods including impingement mixing and static mixing and they may be applied to the substrate to be bonded as thin films or in the form of beads.

The invention is further illustrated, but is not intended to be limited by the following examples in which all parts and percentages are by weight unless otherwise specified.

EXAMPLES

A curative within the scope of the invention (hereinafter curative A) was prepared using the following materials:

64.0 parts of a poly(propylene oxide) triol capped with ethylene oxide (molecular weight -Mw-6,000), 11.0 parts of an aromatic amine terminated polyether prepared by hydrolyzing an isocyanate terminated polyol which has been prepared by the reaction of excess TDI with a 4800 molecular weight polyoxypropylene polyoxyethylene triol.

20.0 parts of 1,4-butanediol, 4.0 parts of bis-(4-aminocyclohexyl)methane, Mw 210, 10.0 parts of sodium potassium aluminosilicate in castor oil—a drying agent—and 0.01 parts of dimethyltin dilaurate catalyst.

A curative (curative B) which is outside the scope of the present invention was prepared using the same components and in the same amounts as noted above except that the aromatic amine terminated polyether of curative A was replaced by 11.0 parts of an aliphatic amine terminated polyether, Jeffamine T-5000, having a molecular weight of 5,500.

The isocyanate used in conjunction with curatives A and B, was a polymeric diphenylmethane diisocyanate having an NCO content of about 32%, an NCO functionality of about 2.4 and a content of the 2,4'-isomer of about 19%.

All samples were prepared at an isocyanate index of 130.

The adhesive formulations were tested for performance using the lap shear test (SAE J1525). Accordingly, sheets of fiber reinforced plastic—FRP—measuring 4"×9"×0.125", were bonded together using metal spacers to insure bond thickness of 0.030" and an overlap length of 1 inch. The surface of the FRP was wiped with a dry cloth prior to bonding to remove dust. No other surface preparation was used. The adhesive was cured in a treated press for 90 seconds at a temperature of 250° F., followed by postcuring of 30 minutes at 250° F. Test specimens (1 inch wide) were cut from the cured samples using a diamond tipped saw. The samples were tested at (i) room temperature (RT), and (ii) a temperature of 82° C. after conditioning for 1 hour at that temperature.

| Example | polyol | Adhesive performance | | | |
|---|---|---|---|---|---|
| | | Lap Shear (RT) | | Lap Shear (82° C.) | |
| | | PSI | % fiber tear | PSI | % fiber tear |
| 1 | curative A | 580 | 99 | 411 | 89 |
| 2 | curative B | 568 | 82 | 254 | 3 |

The results clearly demonstrate that an adhesive curative prepared using an aromatic amine terminated polyether produces an adhesive with superior high temperature properties as compared to a similar curative prepared using an aliphatic amine terminated polyether.

The adhesive of the invention is suitable for bonding, flexible, semi-structural and structural substrates in a variety of forms, including cloth, sheets, foams and the like.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A two component polyurethane adhesive comprising the reaction product of a curative and a polyisocyanate, said curative comprising a polyol and an aromatic amine terminated polyether containing two or more primary amine groups and having a molecular weight of from 250 to about 10,000, said adhesive being characterized in its improved sag resistance, its heavy body which is obtained without resort to included fillers or to prepolymerization of the components and by that the viscosity of its components is under about 15,000 cps.

2. The adhesive of claim 1, wherein said curative comprise
   (i) 0.1 to 4.0 equivalents of a polyhydroxy functional material having an equivalent weight of at least 150 and a hydroxy functionality of at least 2,
   (ii) 0.03 to 5.0 equivalents of a multi functional amine terminated polyether having an equivalent weight of about 250 to 10,000.

3. The adhesive of claim 2, wherein said curative further comprise 2 to 7 equivalents of a low molecular weight aliphatic polyol having a hydroxy functionality of at least 2 and a molecular weight of below 500.

4. The adhesive of claim 2, further comprising one or more isocyanate reactive polyamines having an equivalent weight of about 30 to 200, and a functionality of about 2 to 4, in a sufficient amount to produce adequate resistance to flow when said curative and said polyisocyanate are mixed.

5. The adhesive of claim 1, wherein said polyisocyanate comprise an organic isocyanate, in an amount sufficient to render the isocyanate index of said adhesive between about 0.80 to 1.50.

6. The adhesive of claim 5, wherein said index is about 1.1 to 1.3.

* * * * *